US012619057B2

(12) United States Patent
Anhut et al.

(10) Patent No.: US 12,619,057 B2
(45) Date of Patent: May 5, 2026

(54) LIGHT-FIELD MICROSCOPY IMAGE CAPTURING METHOD AND LIGHT-FIELD MICROSCOPE

(71) Applicant: Carl Zeiss Microscopy GmbH, Jena (DE)

(72) Inventors: Tiemo Anhut, Jena (DE); Daniel Schwedt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 202 days.

(21) Appl. No.: 18/295,340

(22) Filed: Apr. 4, 2023

(65) Prior Publication Data

US 2023/0324661 A1 Oct. 12, 2023

(30) Foreign Application Priority Data

Apr. 11, 2022 (DE) ..................... 10 2022 203 632.8

(51) Int. Cl.
*H04N 23/00* (2023.01)
*G02B 21/00* (2006.01)
*G02B 21/08* (2006.01)
*H04N 23/957* (2023.01)
*H04N 23/56* (2023.01)

(52) U.S. Cl.
CPC ....... *G02B 21/0032* (2013.01); *G02B 21/008* (2013.01); *G02B 21/082* (2013.01); *H04N 23/957* (2023.01); *H04N 23/56* (2023.01)

(58) Field of Classification Search
CPC .... H04N 23/957; H04N 23/56; G02B 21/008; G02B 21/082; G02B 21/0032
See application file for complete search history.

(56) References Cited

U.S. PATENT DOCUMENTS

2019/0113731 A1* 4/2019 Betzig ..................... G02B 27/58
2022/0043246 A1* 2/2022 Anhut ................ G02B 21/0076

FOREIGN PATENT DOCUMENTS

DE 102014102215 A1 8/2015
DE 102020209889 A1 2/2022

* cited by examiner

*Primary Examiner* — Zhihan Zhou
(74) *Attorney, Agent, or Firm* — DUANE MORRIS LLP

(57) ABSTRACT

The invention relates to a light-field microscope and a light-field microscopy image capturing method, including the steps of providing an illumination radiation from at least one light source; modulating the illumination radiation by virtue of adjusting the intensity distribution thereof; generating a dynamic light sheet in a sample space, in which a sample to be imaged can be arranged; scanning a region of the sample to be imaged using the light sheet; collecting a detection radiation and detecting image signals using light-field technology. The illumination radiation is modulated by virtue of the light source being controlled and an intensity of the illumination radiation provided by the light source being altered, especially in a controlled fashion over time. Image recordings of the sample are triggered for different positions of the light sheet.

8 Claims, 6 Drawing Sheets

LIGHT-FIELD MICROSCOPY IMAGE CAPTURING METHOD AND LIGHT-FIELD MICROSCOPE

RELATED APPLICATION

The present application is a U.S. National Stage application of German Application No. DE 10 2022 203 632.8 filed on Apr. 11, 2022, the contents of which are herein incorporated by reference in their entirety.

FIELD OF THE INVENTION

The invention relates to a light-field microscopy image capturing method and a light-field microscope according to the preambles of the independent claims.

BACKGROUND OF THE INVENTION

Light field microscopy can be used as a method for simultaneous three-dimensional imaging of even relatively large objects such as the brains of small mammals and living samples such as fish embryos or fruit fly larvae.

To enable imaging, the objects to be imaged are specifically provided with markers to this end, the markers emitting a detection radiation as a consequence of being excited with a suitable wavelength. Usually, fluorescence markers or fluorophores serve marking purposes in this context. As a result of illumination with radiation at an excitation wavelength, a fluorescence radiation, as detection radiation, can be excited, captured and used for imaging.

By way of example, if thick biological samples are illuminated using a spectral lamp, fluorescence radiation is likewise excited, albeit quite unspecifically, in the entire illuminated sample as a result of the effect of the illumination radiation.

Light-field microscopy is a far-field method, by means of which a three-dimensional image data record can be generated from the recorded parallactic views of the sample. However, it proves not possible to discriminate emission light generated away from the focus. As a result, what is known as optical cutting, as known from laser scanning microscopes, for example, is not possible.

To improve the contrast of the desired signal vis-à-vis background signals, it is possible to combine the light-field detection with appropriate illumination modalities. An example to this end has been disclosed in DE 10 2014 102 215 A1. It proposes the illumination of a sample using a light sheet radiated into the sample at an angle. The thin light sheet is moved (scanned) over the region of the sample to be imaged.

The illumination by means of a light sheet and the capture of image data can be implemented in various ways.

In the case of a continuous light sheet scan, the entire sample field to be imaged is scanned during the camera recording period. However, on account of the oblique incoming radiation of the light sheet, the excitation light leaves the sample field after a certain propagation length, with the result that relatively deep depths in the sample reached in that case no longer contribute to the detection radiation captured by the camera. Moreover, backscattering of excitation light is not implemented over the entire numerical aperture (NA) of the detection objective, with the result that the collection efficiency is significantly reduced in this respect. In comparison with the illumination by a spectral lamp (NA=0), this method brings about a slight improvement in the image contrast with a hardly reduced volume rate.

A further option consists in a triggered light-sheet scan. In this case, the camera is triggered at each position of the light sheet and an image recording is captured. This prevents the out-of-focus background generated at other positions by the departing light sheet from adding to the desired signal on the camera. Thus, unwanted background signals can initially be removed by calculation before a three-dimensional view of the sample is generated. The image contrast is significantly increased in this method, but to the detriment of the achievable volume rate. This method is particularly suitable if the volumes of interest, that is to say the regions of the sample to be image, take up a relatively small field of view.

In a third procedure, structured illumination is generated by virtue of the light intensity of the light sheet being modulated at different positions. Moreover, the entire field of view is scanned during one camera recording period. The structured illumination can be used to eliminate out-of-focus background light by calculation. Only a few—generally three—image recordings are required to this end. Hence, the loss of volume rate is still manageable and an improvement in the contrast is obtained vis-à-vis the continuous light-sheet scan.

OBJECTIVES OF THE INVENTION

The invention is based on the object of proposing an option for image capture by means of light field detection that is improved over the prior art.

The object is achieved by means of the subjects of the independent claims. The dependent claims relate to advantageous developments of the invention.

This object is achieved by an image capturing method from the field of light-field microscopy. As one step, the method includes the provision of an illumination radiation from at least one light source. The illumination radiation is modulable by virtue of the intensity distribution thereof being adjusted. As an illumination beam, the modulated illumination radiation is radiated into an entrance pupil of a common illumination and detection objective (also referred to as common objective below) at an entrance location. By virtue of a first angle of incidence of the modulated illumination radiation being altered multiple times, a dynamic light sheet is generated in a sample space in which a sample to be imaged can be arranged. The dynamic light sheet is brought into a number of different positions. A detection radiation coming from the sample space is collected by means of the common objective and is guided along a detection beam path. A plurality of partial image representations are generated in a detection plane by means of a microlens array arranged in the detection beam path. The partial image representations are detected as respective image signals of an image recording and the captured image signals are evaluated on the basis of their associated location information and angle information.

The image capturing method is characterized in that the illumination radiation is modulated by virtue of the light source being controlled and an intensity of the illumination radiation provided by the light source being altered in controlled fashion over time. An image is recorded whenever the dynamic light sheet has been brought into a position in a first alternative (alternative 1) or while the dynamic light sheet adopts different positions in a second alternative (alternative 2). To this end, a detector used for the image recording or a camera is controlled accordingly (triggered; synchronized to the adoption of various positions).

Recording an image within the meaning of this description is understood to mean the capture of image data. In this case, image data of a single light sheet or one position of a light sheet can be captured during an image recording (alternative 1). According to alternative 2, image data of a plurality of light sheets or a plurality of positions of a light sheet can be captured during an image recording (virtually simultaneous capture). In particular, an image recording is given by the integration time or shutter speed of a camera or detector.

An image is a representation of the object to be imaged, for example of a sample, which was generated from the set of image data captured during an image recording.

The modulation of the illumination irradiation provided by the at least one light source is implemented by controlling specifically this light source or the available light sources. In particular, the intensity of the provided illumination radiation is set in this case with selected values from a range of zero to the maximum possible intensity. An illumination pattern is generated in the sample space, and in a sample optionally arranged therein, as a result of the interaction with a controlled movement of the modulated illumination radiation, which is radiated into the sample space, along a scanning path lateral to the propagation direction of said illumination radiation. A width of the light sheet is determined by the breadth of the lateral deflection.

Within the meaning of this description, an illumination pattern can be a light sheet used to selectively illuminate a section of the sample. The light sheet may be structured in certain configurations of the invention, as is yet to be explained in more detail below.

The invention relates to a dynamic light sheet (also shortened to light sheet below). In contrast to a static light sheet generated by means of beam-shaping optical units, for example using at least one cylindrical lens, a dynamic light sheet arises as a result of a fast scanning movement of at least one illumination beam laterally in relation to its propagation direction.

In an advantageous configuration of the method according to the invention, the illumination radiation is modulated while the latter is offset or deflected (scanned) laterally in relation to its propagation direction. In this case, the lateral movement (scanning movement) is particularly prominent in the component of the illumination beam which reaches the sample space. A modulation during a scanning movement brings about different intensity values of the light sheet along its width and can consequently bring about structuring of the light sheet over its width (see below). At the same time or as an alternative, a change in the intensity values along the scanning path can also be used to set desired illumination profiles.

Setting an illumination profile can advantageously be used to compensate for effects of emission profiles of the light source and/or optical influences of elements of the illumination beam path. By way of example, the radiation emitted by a light source in the form of a laser light source usually has a Gaussian intensity profile. If the illumination radiation is shaped by the effect of optical elements, the Gaussian intensity profile is usually maintained, possibly in modified form. If the illumination radiation is moved back and forth along the scanning pattern (scanned), the sections near the reversal points of the scanning movement at the ends of the scanning path are illuminated less intensely than central sections of the scanning path, for example. In order to compensate for such unequal illumination profiles, the intensity values can be increased in a controlled fashion when reaching the ends of the scanning path, and can be reduced again on the return trip.

A possible procedure consists of ascertaining and retrievably storing a modulation function on the basis of an intensity distribution of the illumination radiation at rest, which intensity distribution is known in advance.

This modulation function can be considered to be a control function by means of which locations along at least one section of the scanning path are assigned certain modulation factors which, if implemented under control as respective local/location-related intensities of the scanned illumination radiation, bring about a desired intensity profile over the relevant section of the scanning pattern. By way of example, the modulation factors are assigned to intensity values of the light source such that illumination radiation of a certain intensity is brought about by a certain modulation factor. By way of example, the modulation function can be ascertained empirically and/or by means of a simulation.

If the illumination beam is scanned multiple times in a plane, the modulation of the illumination radiation is matched to the respective localization of the scanned illumination beam for the purpose of the persistent implementation of the structuring during each scanning movement. The scanning movement can be implemented in only one lateral direction (scanning either during a movement there or a movement back) or carried out with a reversal of the scanning direction (scanning during a movement there and a movement back).

Within the meaning of the description here, a structured light sheet is therefore understood to mean (in particular) a light sheet which has sections with varying intensities along its width, that is to say in a direction of its extent transversely to the beam direction of the modulated illumination radiation. These intensities along the cross section of such a structured light sheet may have values between zero and a maximum due to the utilized light source and the transmission values of the illumination beam path. Therefore, according to the invention, structuring along the width is achieved by controlling the light source such that the spatial structuring of the light sheet is generated as a result of the interaction with a change of the first angle of incidence. In order to generate spatial and/or temporal structuring of the light sheet as a result, the modulation and the changes to the first angle of incidence of the illumination radiation are matched to one another.

Further options for generating a structured light sheet on the basis of selected beam shapes, such as Bessel beams or Sinc3 beams, and on account of arising constructive and destructive interferences are referred to herein as interference-structured light sheets for the purpose of maintaining a distinction.

The dynamic light sheet, be it in its manifestation as a nonstructured or structured light sheet, is brought into a number of different positions in order to scan, using the light sheet, a region of the sample to be imaged as a result. By the effect of the wavelengths of the light sheet in particular, the output of a detection radiation is caused, for example excited, within the sample.

If a structured light sheet is generated and the sample is at least regionally scanned therewith, it is possible to optionally reduce unwanted background signals by means of a combination by calculation of a plurality of image recordings, specifically at least two and better three image recordings.

In a further configuration of the method according to the invention, the modulated illumination radiation can be shaped into a line-shaped light distribution. Such shaping can be brought about using a cylindrical lens, by the way of the optical effect of which the modulated illumination radiation is focused in a first direction. The line-shaped light distribution is radiated into the entrance location in the entrance pupil of the common objective. Even though a light sheet which at least is narrow is already generated in the sample space as a consequence of the line-shaped light distribution, the first angle of incidence of the line-shaped light distribution is altered multiple times in order to allow a dynamic light sheet to arise. The thickness of the generated light sheet can optionally be restricted using a second cylindrical lens, the effect of which leads to a focusing of the illumination radiation in a second direction orthogonal to the first direction.

In order to optionally achieve an oblique position of the light sheet in the sample space, the entrance location in the entrance pupil is chosen to be away from the optical axis of the common objective. The oblique position depends on the extent of the radial distance of the entrance location from the optical axis, that is to say on the point at which the entrance location is located on a radius directed from the optical axis to the edge of the entrance pupil.

If the entrance location is away from the optical axis, the inclination angle of the structured light sheet with respect to the optical axis is greater than zero degrees. Such an oblique position enables the capture of a detection radiation in a plan view of the inclined light sheet. The inclination angle can be adjusted within a range between 0° inclusive (see below) and the maximum angle supported by the NA (numerical aperture) of the objective. The maximum adjustable angle relates to the maximum illumination NA, which may deviate from the detection NA.

In order to generate an inclined light sheet on the object side, the first angle of incidence of the illumination beam can be altered substantially perpendicular to the radius. The illumination beam is consequently displaced in a direction perpendicular to the radius while maintaining the oblique position (inclination), and the illumination location in the object plane changes accordingly. If the change of the respective first angle of incidence is implemented sufficiently quickly, for example within the recording time or shutter speed of a camera used for the image recording, and if this change is preferably repeated, then an inclined light sheet is generated on the object side.

The image capturing method according to the invention can also be carried out whenever the optical axis passes through the chosen entrance location. The inclination angle between the light sheet and optical axis is zero degrees in that case. The light sheet is generated in at least one position parallel to the optical axis for the purpose of scanning the sample. Detection radiation emerging from the end face of the respective light sheet is captured by means of the centrally arranged microlenses of the microlens array, while microlenses arranged closer to the edge of the microlens array generate partial image representations with an angled viewing direction on the light sheet.

The light sheet generated in the sample space is brought into various positions for the purpose of scanning a region of a sample to be imaged. This can be implemented by a controlled horizontal and/or vertical displacement of the sample, for example by virtue of the latter being arranged on an adjustable sample stage and the sample stage being adjusted accordingly together with the sample. In addition or as an alternative, it is possible to set different positions by virtue of a second angle of incidence being altered, the illumination radiation or the line-shaped light distribution being directed at said angle of incidence into the entrance location in the radial direction. The second option allows fast scanning without needing to move the sample.

In the first alternative of the method according to the invention, an image is recorded whenever the light sheet has been brought into a position. The camera (detector) used for image recording is triggered accordingly in the process, in particular by control commands of a controller. In this configuration, each image recording is carried out at (exactly) one position.

In the second alternative of the method, an image is recorded while the light sheet adopts different positions. In this case, the camera used for capture is triggered so that a respective integration time of the camera is matched to the presence of the positions to be captured.

In a configuration of the method according to the invention, a structured light sheet can be generated and used, with a region of the sample to be scanned being illuminated by the light sheet in a plurality of positions and the corresponding image data being ascertained. In the process, the region may be scanned multiple times, with the structure of the light sheet being altered during each scan. By way of example, the region can be illuminated with one structured light sheet in each case, the patterns of said light sheets having a phase angle shifted from one another through 120° in each case.

The image capture method according to the invention can be carried out using a light-field microscope comprising at least one light source for providing an illumination radiation, a modulation device for controlling the intensity distribution of the illumination radiation, and a deflection device (scanner) for controlled adjustment of a respective first and/or second angle of incidence of the illumination radiation at an entrance location in an entrance pupil of a common illumination and detection objective. By means of the common objective, the illumination radiation is radiated into a sample space in which a sample can be arranged. Furthermore, a controllable optical offset device is present for the controlled generation of a lateral offset of the beam path of the modulated illumination radiation relative to the optical axis of the illumination beam path and to the optical axis of the common objective. The offset device also serves to control a site of an entrance location of the illumination radiation in the entrance pupil of the common objective.

The use of a common objective for the illumination of the sample and for the capture of the detection radiation saves installation space and reduces the number of expensive optical elements which need to be adjusted relative to one another with great outlay.

A microlens array is arranged in a detection beam path which serves to guide detection light. It has a focal plane in which a plurality of partial image representations are imaged as a result of the effect of the microlenses of the microlens array. A spatially resolved detector is arranged in the focal plane of the microlens array and serves to capture the partial image representations.

The microlens array can be arranged in an image plane (spatial domain) or in a plane that is conjugate to the entrance pupil of the detection objective (Fourier light-field technology; frequency domain).

In (Fourier) light-field technology, the detection light is divided into a multiplicity of partial image representations by means of the microlens array arranged in a plane that is conjugate to the entrance pupil. Each of the microlenses optically acts like an individual sub-aperture and in the process generates an image representation of the sample using a part of the angular spectrum that is assigned thereto.

The sample is thus viewed from different viewing directions. The image points brought about by the sub-apertures are different from their adjacent image points and are individually captured by means of the detector elements of the detector. This has the advantage of imaging the sample volume without artefacts on the detector. Subsequently, the multiplicity of image points are combined by calculation, wherein the many individual pieces of information allow a computational generation, optionally of a two-dimensional or three-dimensional image representation of the scanned region of the sample. It is finally possible to perform a back-calculation of an image representation of the sample volume from the resulting parallax.

If the microlens array is situated in an image plane of the detection beam path (spatial domain), then punctiform light sources in the object plane are imaged into the plane of the detector in a distribution that depends on the distance. If the relationships between distance and associated imaging pattern are known, an image representation of the sample volume can also be back-calculated in this embodiment.

The detector or the camera can have a two-dimensional chip with detector elements, for example a CCD chip, a CMOS, an sCMOS chip or a SPAD (single photon avalanche diode) array.

The microscope advantageously also has an evaluation unit, which is configured for evaluating the captured image signals of the detector in accordance with light-field technology. That is to say that the evaluation takes place on the basis of and taking into consideration spatial information and angle information of the light beams that are captured per detector element (pixel) of the detector.

A controller for controlling the deflection device and the at least one light source is characterizing for a microscope according to the invention. In this case, the controller is configured to alter an intensity distribution of the light source provided illumination radiation in controlled fashion over time by controlling the light source. Then, the image recordings are made whenever the dynamic light sheet is brought into a position (alternative 1) or while the dynamic light sheet adopts various positions (alternative 2). In this case, the controller is configured to trigger an image recording in accordance with the respectively selected alternative, in particular to control the detector accordingly.

By way of example, the evaluation unit and the controller can each be formed as a computer or as compartments of a computer. The controller is used to generate control commands with which, for example, the light source, the offset device, the deflection device and optionally the detector can be controlled. By way of example, the controller is used to trigger the detector in response to the light source or in response to the deflection device and the light source. The individual images recorded by the camera are combined by calculation to form image stacks within the meaning of the light-field technology by means of the correspondingly configured evaluation unit. The evaluation unit is connected to the controller in a way that is suitable for transmitting data.

In a further embodiment, the light-field microscope may have a controller which is additionally configured to control a deflection of the illumination radiation over time by way of the effect of the deflection device such that a structuring of the dynamic light sheet in the sample space is brought about by matched interactions of the various intensity distributions and the deflections of the illumination radiation.

Moreover, an adjustable or variable optical unit may optionally be present in the detection beam path. It serves to reposition the image representation of the entrance pupil into a plane which is conjugate to the entrance pupil and in which the microlens array is arranged. For example, an altered axial site of the entrance pupil of the objective can be adapted to the site of the plane of the microlens array following an interchange of the common objective.

If the microlens array has been arranged in an image plane, then the variable optical unit can serve to match an altered focal position of the common objective and the plane of the microlens array to one another.

In a further embodiment of the microscope, at least one optical element, for example at least one cylindrical lens, may be present in the illumination beam path for the purpose of shaping the modulated illumination radiation to form a line-shaped light distribution. Optionally, a further cylindrical lens may be present in the illumination beam path, the effect of which is able to influence a thickness of the light sheet generated in the sample space. Advantageously, the cylindrical lenses can be introduced into and removed from the illumination beam path in controlled fashion.

The controllable optical offset device may be formed by a plane parallel plate that is transparent to the illumination radiation and inclined relative to the beam path of the illumination radiation or may be formed by an adjustable mirror arrangement. By way of example, such a mirror arrangement may have a combination of a 2D MEMS, followed by two galvanometer scanners, which advantageously have large mirror surfaces. Using such a combination, it is possible to home in on any desired point in the plane of the entrance pupil of the common objective.

On the one hand, the advantages of the invention are found in an easily implementable option of providing a modulated illumination radiation by virtue of the light source being controlled directly. The variable generation of a dynamic light sheet in combination with a flexible control of the camera in respect of the captured positions already opens up a broad spectrum of application, both of the method and of the light-field microscope, without having to additionally make relatively large changes to an available light-field microscope. The advantage of the illumination with a light sheet is that the layer of the sample is illuminated only thinly at a time and that the bleaching outside the light sheet is consequently avoided. The method according to the invention can make use of a frequency domain light field or spatial domain light field, depending on the plane in which the microlens array is arranged.

BRIEF DESCRIPTION OF THE DRAWINGS

The invention will be explained in more detail below on the basis of figures and exemplary embodiments. In detail.

DESCRIPTION OF THE INVENTION

Figure 3:
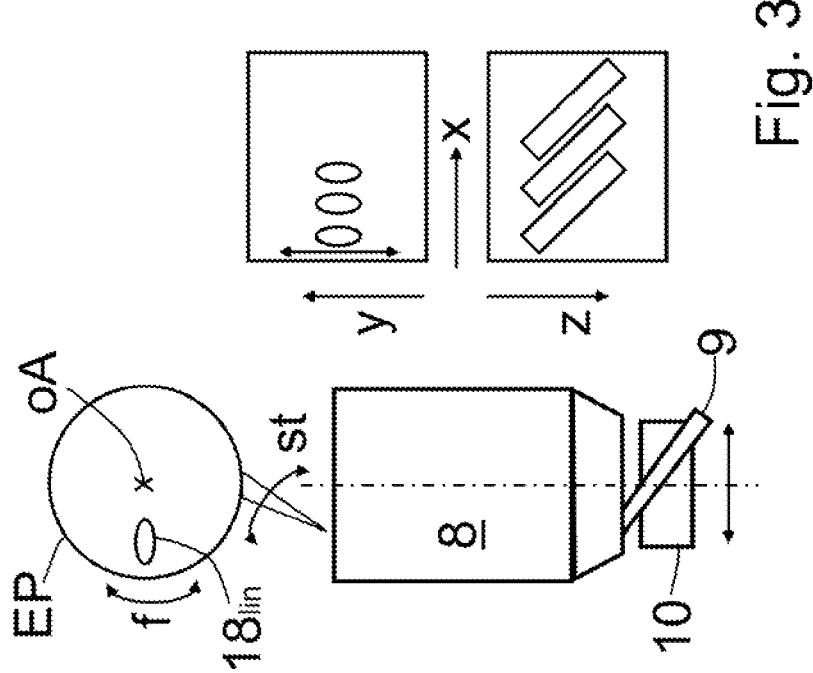
FIG. 3 is a schematic illustration of a second configuration of a method according to the invention.
Figure 2:
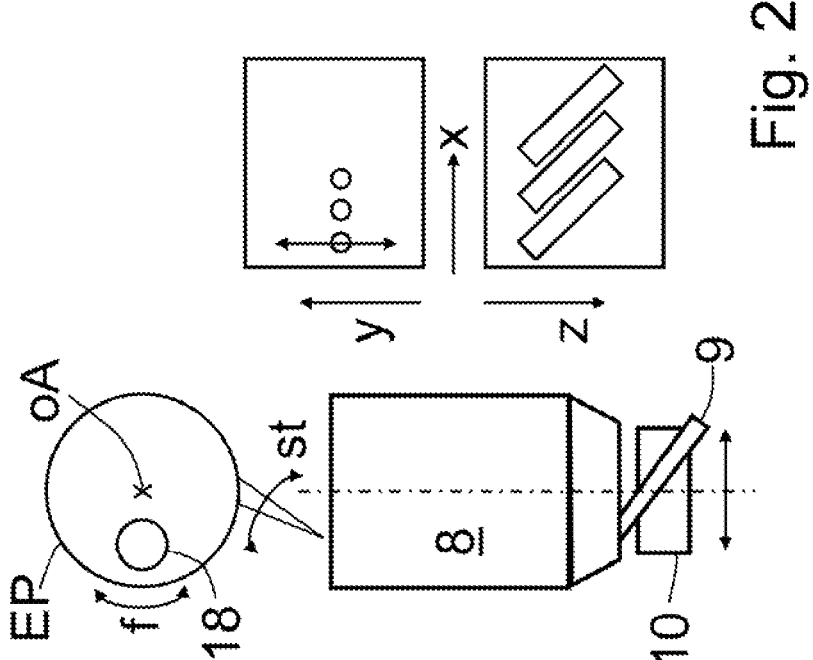
FIG. 2 is a schematic illustration of a first configuration of a method according to the invention.
Figure 4:
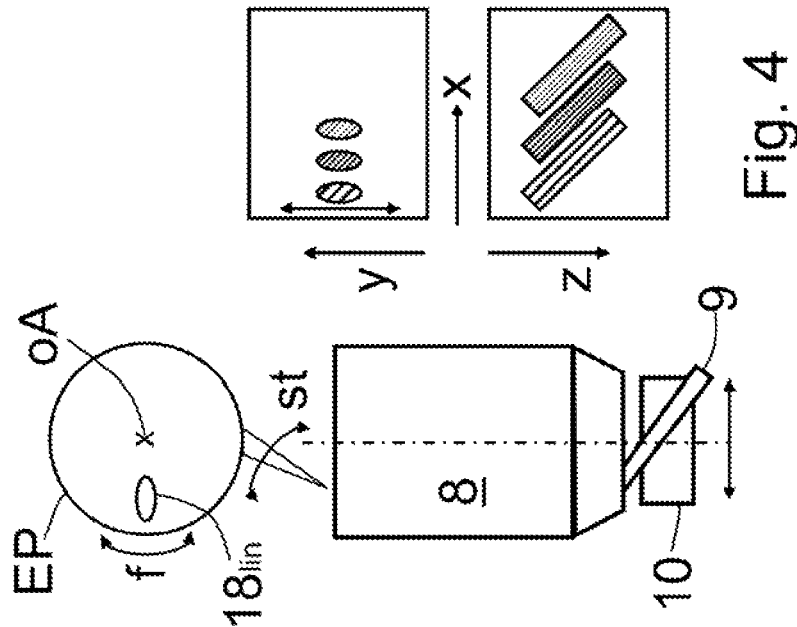
FIG. 4 is a schematic illustration of a third configuration of a method according to the invention.

The same technical elements are provided with the same reference signs in the following schematic illustrations of examples of the invention. FIGS. 2 to 4 illustrate configurations of the method according to the invention.

Figure 1:
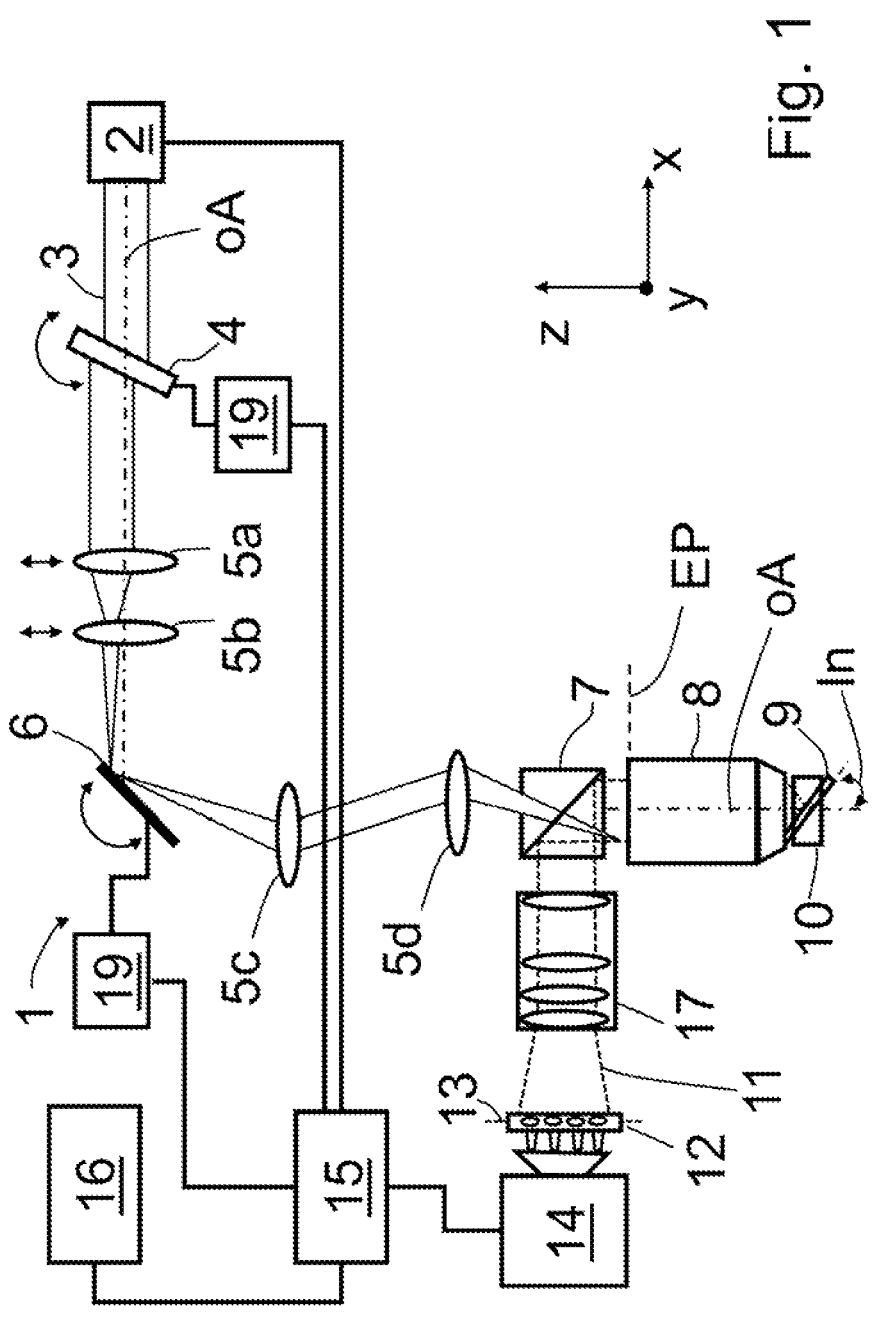
FIG. 1 is a schematic illustration of an exemplary embodiment of a light-field microscope according to the invention.

In a first exemplary embodiment of a light-field microscope 1 according to the invention, a light source 2 in the form of a laser light source for providing an illumination radiation 3, a controllable offset device 4 for adjusting a beam offset relative to the optical axis oA, optical lenses 5a, 5b, 5c and 5d, a deflection device 6 or scanning device 6 (also referred to as scanner 6 below), a color splitter 7 and an objective 8 with an entrance pupil EP which acts as an illumination objective are present in an excitation beam path (FIG. 1). The Cartesian coordinate system used in FIG. 1 accordingly also applies to the illustrations in FIGS. 2 to 4.

An optionally variable optical unit 17, a microlens array 12 in a plane 13 that is conjugate to the entrance pupil EP, and a detector 14 in the form of a spatially resolving camera are present in a detection beam path (symbolized by way of broken solid lines). As a result of the effect of the microlens array 12, the detection radiation is imaged in the form of individual partial image representations onto the detector 14. The detector 14 is connected to a controller 15 in a manner that is suitable for exchanging data. The controller 15 is in turn connected to an evaluation unit 16. By means of the controller 15, it is possible to generate control commands that serve to control the offset device 4 and the scanning device 6. The controller 15 is connected to the technical elements to be controlled. The evaluation unit 16 is configured for evaluating and further preparing the image data within the meaning of light-field technology.

In a further possible embodiment of the light-field microscope 1 according to the invention, the microlens array 12 is arranged in an image plane. The captured detection radiation is imaged onto the detector 14 which is situated in the focal region of the microlenses of the microlens array 12.

The controller 15 is used to influence the light source 2 to the effect of the intensity of the illumination radiation 3 being varied over time (modulated) as desired. Thus, the intensity may be at a maximum over predetermined time periods and may be reduced over further time periods, with it also being possible to set time periods without provided illumination radiation 3 (intensity equal to zero).

During the operation of the light-field microscope 1 according to the invention, the laser light emitted by the light source 2 is steered as illumination radiation 3 to the offset device 4. Depending on the control state of the offset device 4, the illumination radiation 3 is offset perpendicularly with respect to the optical axis oA. As a result, the entrance location of the focused illumination radiation 3 in the entrance pupil EP is defined by such a lateral offset. In the exemplary embodiment shown, the offset device 4 is formed by a glass plate that is controllable by means of a drive 19. The former may be rotatable such that any desired entrance location in the entrance pupil can be set depending on the rotational position and tilt angle of the offset device 4. Alternatively, the offset device 4 may be tilted about two axes. Depending on the entrance location, a light beam that is inclined with respect to the optical axis oA is formed in the sample space, with direction and inclination angle of the light beam depending on the azimuthal site of the entrance location and the distance thereof from the optical axis oA.

The modulated illumination radiation 3 (laser light) is focused in a direction transversely to the optical axis oA by means of an optionally present first cylindrical lens 5a and is shaped to form a line-shaped light distribution $18_{lin}$ (see also FIGS. 3 and 4). A width of the line-shaped light distribution $18_{lin}$ can be adjusted by means of an optionally present second cylindrical lens 5b. On an optional basis, the cylindrical lenses 5a and 5b can each be pivoted into and pivoted out of the beam path of the illumination radiation 3.

It is therefore possible within one configuration of the method according to the invention to direct the illumination radiation 3 in the form of a round light spot (spot; focus) into the entrance pupil EP (see FIG. 2). The region of incidence of the illumination radiation 3 on the plane of the entrance pupil EP determines the entrance location in each case.

The modulated illumination radiation 3 reaches the deflection device 6 (scanner 6), which is controlled by means of the controller 15 and which deflects the illumination radiation 3 in an x-direction x and/or in a y-direction y. Using the scanner 6, it is possible to vary the angle of incidence of the illumination radiation 3 at an entrance location in the entrance pupil EP (objective pupil), both transversely to the radius (first angle of incidence) of the entrance pupil EP and along a radius (second angle of incidence). The scanner 6 is arranged conjugate to the entrance pupil EP.

As will be explained in more detail below, the illumination radiation 3 is directed, after it has passed through a scanner lens 5c, a tube lens 5d and the dichroic color splitter 7, into an entrance location in the entrance pupil EP that is located away from the optical axis oA of the objective 8. On the object side, a light sheet 9 which includes an inclination angle In with the optical axis oA and is inclined to the optical axis oA is generated by the objective 8 as a result of interaction with the deflection device 6. If a sample 10 is located in a sample space in front of the objective 8, the light sheet 9 can be directed into said sample.

By means of the effect of the light sheet 9 formed from the illumination radiation 3, fluorescence can be excited in the sample 10 and be emitted as detection light 11. Emitted detection light 11 is collected by the objective 8, which serves both as the illumination objective and as the detection objective. Owing to the effect of the color splitter 7, the detection light 11, which has a longer wavelength than the illumination radiation 3, is reflected into the further course of the detection beam path and reaches the microlens array 12 via the variable optical unit 17 (focal length-variable imaging optical unit 17). The microlenses, which are shown by indication, in each case act as sub-apertures and can be considered to be individual imaging systems. The image points brought about by the individual sub-apertures are captured, in the form of image data, by correspondingly positioned detector elements of the detector 14 and transmitted to the control unit 15 and the evaluation unit 16.

The optionally present variable optical unit 17 may be a zoom optical unit, with which a magnification scale of the detection beam path can be set. In a further embodiment of the light-field microscope 1, the variable optical unit 17 can be an optical unit for setting the axial position of the plane 13 that is conjugate to the entrance pupil EP. Since the axial position of the entrance pupil EP can vary in the case of an objective change, it is advantageous to be able to correspondingly displace the plane 13 that is conjugate thereto into the position of the microlens array 12. An adjustment of a current focal plane to the position of the microlens array 12 is likewise possible.

FIGS. 2 to 4 in each case show simplified illustrations of the objective 8, a top view of the entrance pupil EP and the light sheet 9, which is brought about by way of the respective illumination situation. In addition to the objective 8, the figures in each case show plan views of the illuminations effected in the sample 10 in an xy-plane and generated light sheets 9 in an xz-plane.

FIG. 2 shows an illumination situation in which a plurality of regions of the sample 10 illuminated by the light sheet 9 are generated sequentially in time. The positions of the light sheets 9 relative to the sample 10 and relative to one another can be such that the illuminated regions do not overlap. To completely scan a region of the sample 10 to be imaged, the positions may also be chosen such that the light sheets 9 overlap in order to obtain Nyquist sampling of the field of view.

The focus 18 of the illumination radiation 3 at the entrance location is round and relatively large in this configuration. A collimated light beam with a relatively small diameter (see the illustration in the xy-plane) is generated in the sample space as a result.

A dynamic light sheet 9 is obtained by virtue of the first angle of incidence of the illumination radiation 3 at the entrance location being altered multiple times in the direction of the y axis (y-direction y) by means of the deflection device 6; this is represented by the letter "f". In particular, the illumination radiation 3 is pivoted back and forth quickly multiple times (scanned) within a predetermined angle range at the entrance location, as a result of which the light beam under an unchanging inclination angle In is moved back and forth along a path in the direction of the y-axis. The path determines the resultant width of the dynamic light sheet 9. The intensity of the light beam may optionally vary during such a pivoting movement, that is to say while passing along the path in the y-direction y, as a consequence of the modulation of the illumination radiation 3. By virtue of the respective intensities being matched to the current location of the light beam, a structured light sheet 9 having different intensities along its width in the direction of the y-axis is generated.

To scan the sample 10 using the dynamic light sheet 9 or the structured dynamic light sheet 9, it is possible to change the second angle of incidence of the illumination radiation 3 at the entrance location in the direction of the x-axis. To this end, the deflection device 6 is controlled and the second angle of incidence relative to the optical axis oA is altered accordingly. In FIG. 2, such a change in location is elucidated by an angular range st. Different positions of the light beam are jumped to by virtue of the second angle of incidence being altered sequentially along a radius in the direction of the optical axis oA. If the above-described change in the first angle of incidence in the direction of the y-axis is implemented at these positions, a further light sheet 9 with an unchanging inclination angle In is generated at the new position. Optional structuring of this further light sheet 9 is brought about as described above.

If both cylindrical lenses 5a and 5b are pivoted into the illumination beam path in a further configuration of the method (FIG. 3), an elliptic focus (line-shaped illumination distribution 18lin) arises at the entrance location in the entrance pupil EP (pupil plane) of the objective 8. The light beam in the sample space is collimated and has an elliptical beam profile in the object plane (xy-plane). Hence, a light sheet 9, albeit with a small extent in the direction of the Y-axis, has already been generated in the sample space. In this configuration, too, the light source 2 is controlled and the illumination radiation 3 is modulated by means of the controller 15. A dynamic light sheet 9 is generated in interaction with the deflection device 6.

An image recording can be implemented at any position of the light sheet 9 in both a configuration according to FIG. 2 and a configuration according to FIG. 3. It is also possible to capture a plurality of positions of the light sheet 9 during one integration time of the detector 14. In both cases, the control of light source 2, deflection device 6 and detector 14 is matched to one another by means of the controller 15.

As a result of the inclined illumination, the full illumination of the sample 10 can vary across the field of view. This can be reduced by recording and computing a plurality of images with different illumination geometries. In a method configuration elucidated in FIG. 4, a phase angle of the structuring of the light sheet 9 is altered at each new position by an absolute value, for example by 120° in each case, by virtue of the phase angle being shifted through 120° in one spatial direction, for example along the width of the light sheet, in each case. Such a shift in one direction is symbolized by differently pronounced hatching. In the process, the image data of one phase angle are captured at each position. In further configurations, a dedicated structuring can in each case be generated at each position and a respective image can be captured. Furthermore, it is possible in each case to capture a plurality of positions with a structuring, for example with a phase angle. The region scanned thus is subsequently scanned using light sheets 9 with different structuring, for example a further phase angle. The image data of all positions (three scans in the case of phase angle differences of 120° in each case) can be used to calculate a light field image data record with significantly reduced background information. In this case, it is also possible to obtain a slightly improved lateral resolution in the direction of the structuring in comparison with the unstructured light sheet.

FIGS. 5 to 8 show the basis and the use of a modulation function MF in exemplary fashion.

Figure 5:
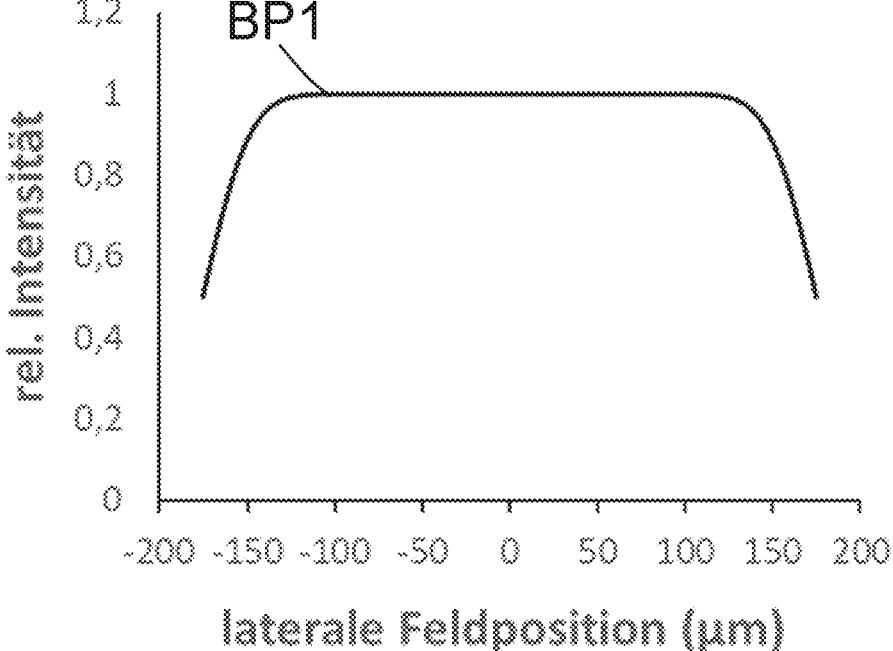
FIG. 5 is an exemplary illustration of an illumination profile of a scanned illumination beam.

FIG. 5 shows a resultant first illumination profile BP1 of a light sheet 9 around a zero position of a scanning path for example reaching from −175 to +175 in the direction of the width of the light sheet 9 (referred to as lateral field position). Relative intensity is plotted on the ordinate, the former relating to a maximum (100%) possible intensity of a light source 2.

The sample 10 is illuminated uniformly in the center of the first illumination profile BP1. However, beyond approximately −120 or +120, the relative intensity in the vicinity of the reversal points of the first illumination profile BP1 drops to 50% of the maximum relative intensity, with the result that the sample is not illuminated homogeneously over the width of the light sheet 9. This effect becomes clearer with increasing size of the region illuminated by the illumination radiation at rest.

Figures 6, 7:
FIG. 6 illustrates a possible modulation function on the basis of the illumination profile shown in relation to FIG. 5.
FIG. 7 illustrates a resultant illumination profile as a result of controlling a light source by means of the modulation function.
Figure 8:
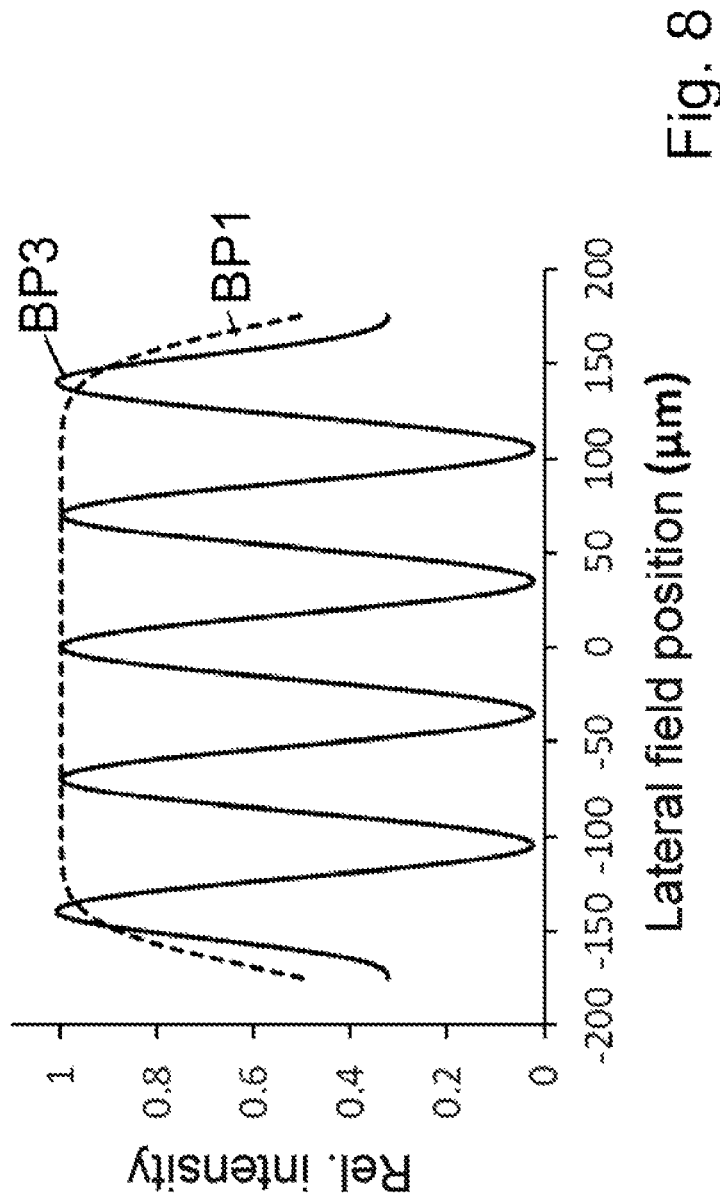
FIG. 8 illustrates a resultant illumination profile as a result of controlling a light source by means of another modulation function, with intensity variations being brought about over the course of the scanning path.

FIG. 6 illustrates, in exemplary fashion, a modulation function MF which was ascertained on the basis of a first illumination profile BP1 as shown in relation to FIG. 5. A modulation factor is assigned to each location along the abscissa over the scanning path (−175 to +175). The light source 2 is controlled during a scan on the basis of the modulation factors and the provided intensity of the illumination radiation 3 is matched to the location currently swept by the scanned illumination radiation 3.

Overall, a resultant second illumination profile BP2 is generated as a consequence of the application of a modulation function MF and, in the vicinity of the reversal points, the latter has a later onset and moreover lower drop of the relative intensities in comparison with the first illumination profile BP1 (shown using a broken solid line for comparison purposes).

The modulation function MF can also be altered in such a way that significant changes in the relative intensities also occur over the course of the scanning path in addition to a reduced drop in the relative intensities at the ends of the scanning path. In this way, it is possible to generate a structured light sheet 9 as depicted in exemplary fashion in FIG. 8 on the basis of a third illumination profile BP3.

In further configurations of the method according to the invention, it is also possible to bring about only a structuring of the light sheet 9 by means of a modulation function MF, without this influencing an edge drop-off of the illumination profile BP3.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Microscope
2 Light source
3 Illumination radiation
4 Offset device
5a First cylindrical lens
5b Second cylindrical lens
5c Scanner lens
5d Tube lens
6 Deflection device; scanner
7 Beam splitter
8 Objective
9 (Structured) light sheet
10 Sample
11 Detection radiation
12 Microlens array
13 Conjugate plane
14 Detector
15 Controller
16 Evaluation unit
17 Variable optical unit/focal-length-variable imaging optical unit
18 Laser focus
$18_{lin}$ Line-shaped light distribution
19 Drive
BP1 First illumination profile
BP2 Second illumination profile
BP3 Third illumination profile
EP Entrance pupil (of the objective 8)
In Inclination angle
MF Modulation function
oA Optical axis
x, y, z Direction

The invention claimed is:

1. Light-field microscopy image capturing method, comprising:

providing an illumination radiation from at least one light source;

modulating the illumination radiation by virtue of adjusting the intensity distribution thereof;

generating a dynamic light sheet in a sample space, in which a sample to be imaged can be arranged, by virtue of the modulated illumination radiation being radiated into an entrance location in an entrance pupil of a common illumination and detection objective and a first angle of incidence of the modulated illumination radiation being altered multiple times;

wherein a layer of the sample is illuminated with said dynamic light sheet only thinly at a time, avoiding bleaching outside the light sheet;

scanning a region of the sample to be imaged using the dynamic light sheet, the dynamic light sheet being brought into a number of different positions;

using the common objective to collect a detection radiation coming from the sample space;

guiding the collected detection radiation along a detection beam path and generating a plurality of partial image representations in a detection plane by means of a microlens array;

detecting the partial image representations as respective image signals of an image recording and evaluating the captured image signals on the basis of their associated location information and angle information;

modulating the illumination radiation by virtue of the light source being controlled directly and an intensity of the illumination radiation provided by the light source being altered in controlled fashion over time, and recording an image whenever the dynamic light sheet is brought into a position;

or recording an image while the dynamic light sheet adopts different positions.

2. Image capturing method according to claim 1, wherein the illumination radiation is modulated while the latter is scanned along a scanning path transversely to its propagation direction in relation to the sample space, with the modulation and the change of the first angle of incidence of the illumination radiation being matched to one another.

3. Image capturing method according to claim 2, wherein a modulation function is determined on the basis of an intensity distribution, known in advance, of the illumination radiation at rest and said modulation function is retrievably stored, with locations along at least one section of the scanning path being assigned modulation factors by way of the modulation function, with a desired intensity profile being implemented over the relevant section of the scanning path in the case of the control-technical implementation of said modulation factors in respect of location-related intensities of the scanned illumination radiation.

4. Image capturing method according to claim 2 wherein the intensity of the illumination radiation is time-modulated during a scan transversely to the propagation direction such that a dynamic light sheet that is structured over its width is generated.

5. Image capturing method according to claim 4, wherein unwanted background signals are reduced by means of a combination by calculation of at least two image recordings.

6. Image capturing method according to claim 1 wherein the modulated illumination radiation is shaped into a line-shaped light distribution and the line-shaped light distribution is radiated into the entrance location and a first angle of incidence of the line-shaped light distribution is altered multiple times.

7. Image capturing method according to claim 1 wherein the dynamic light sheet is directed into the sample space at an inclination angle greater than zero degrees with respect to the optical axis of the common objective by virtue of the entrance location in the entrance pupil being chosen away from the optical axis.

8. Image capturing method according claim 6, wherein the optical axis passes through the chosen entrance location and the structured light sheet is generated in at least one position parallel to the optical axis.

* * * * *